Sept. 3, 1929.    A. F. SHORE    1,727,019
CLIP FOR LAMINATE SPRINGS
Filed April 20, 1927
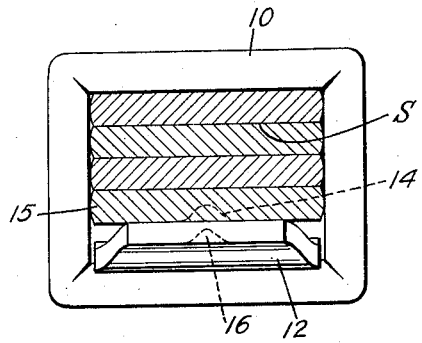
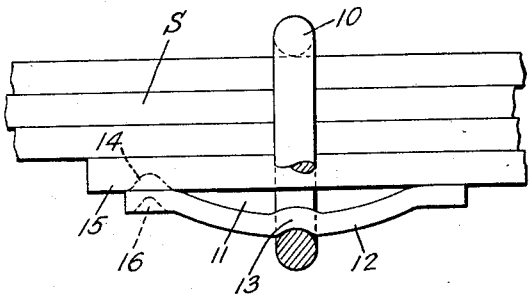
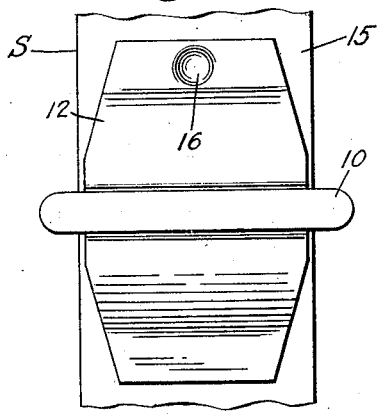
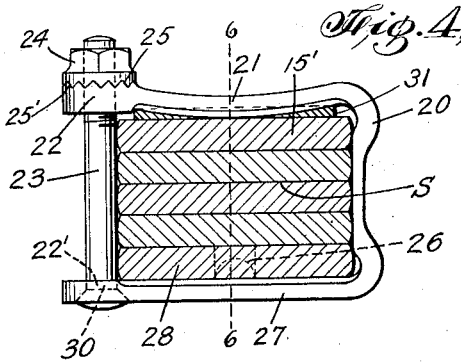
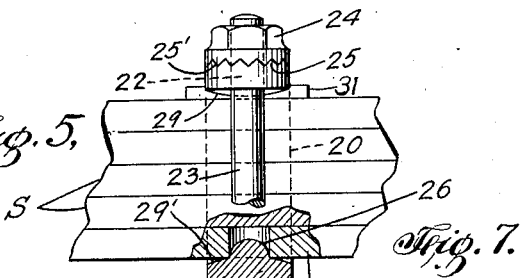
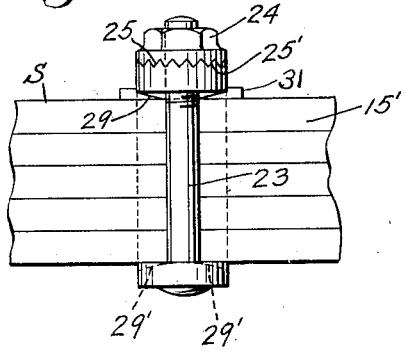
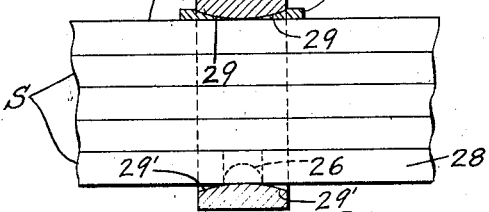
INVENTOR
Albert F. Shore
BY
Gerd Hoffman
ATTORNEY Patented Sept. 3, 1929.

1,727,019

UNITED STATES PATENT OFFICE.

ALBERT F. SHORE, OF NEW YORK, N. Y.

CLIP FOR LAMINATE SPRINGS.

Application filed April 20, 1927. Serial No. 185,155.

This invention relates to improvements in clips for use with multiple-leaf springs for automotive and other vehicles; and one object of the invention is to provide a spring-pressure clip of this character having side-guiding means for holding the leaves of the spring in proper alignment.

Other objects of the invention are to provide means for applying a predetermined elastic or yielding but firm pressure on the spring as a unit and simultaneously increasing the friction of the leaves against one another to enhance the resistance of said spring against movement of the vehicle body and also eliminating rattling of the spring-leaves as a result of wear, as well as eliminating the smaller or lesser vibrations of the vehicle-body and reducing to a minimum the larger or greater vibrations or shocks caused by irregularities in the roadbed; and also means for adjusting said elastic or yielding means, this construction serving to increase the effective strength of the spring and its resistance to deflection and being especially effective when used in connection with springs of the softer type or springs having a comparatively long period of vibration.

Another object of the invention is the provision of a yielding pressure device as described, adapted to prevent excessive play between the spring laminations bound thereby and excessive separation of the leaves.

Another object of the invention is to provide a device as described having convex contacting faces adapted to press against the plane faces of the spring laminations and to rock thereon upon relative longitudinal movement of the leaves.

A further object of the invention is to provide a spring-pressure clip as described having seating means adapted to prevent pivotal movement of the clip to eliminate undue wear of the parts.

Another object of the invention is to provide an improved check for the recoil of the spring, the device herein serving by its predetermined yielding rolling pressure to prevent undue strain upon the leaves upon recoil, thus lessening the danger of breakage of said leaves.

These and other objects of the invention not hereinbefore referred to will be hereinafter described and claimed and are illustrated in the accompanying drawing, in which:

Fig. 1 is a preferred form of my new and improved auto-clip;

Fig. 2 is a side elevation, looking from the left of Fig. 1, only a portion of the spring being shown;

Fig. 3 is a bottom view of Fig. 1;

Fig. 4 is a modified form of the clip shown in Fig 1;

Fig. 5 is a side elevation of the same, looking from the left of Fig. 4, with only a portion of the spring shown;

Fig. 6 is a side elevation, looking from the left of Fig. 4, only a portion of the laminations being shown; and Fig. 7 is a cross section taken on the line 6—6, Fig. 4.

Similar characters designate like parts in all the figures of the drawing.

Referring to the drawing, Figs. 1, 2 and 3 illustrate a preferred embodiment of my invention, in which there is shown a one-piece link 10, through the opening of which the leaves of the spring pass, this link being preferably constructed of round stock parallel to the spring-face and of rectangular shape, with the space between the sides substantially of the same width as the width of the spring but the opening being of greater area than the combined thickness of the leaves of the spring, as shown at 11. In this arrangement, the link is applied to the spring before the body of the vehicle is connected thereto. To yieldingly exert an elastic or resilient force on the spring-leaves in a direction toward each other, a bow-shaped member 12 is inserted between the link and the spring, as clearly shown in Fig 2. This member 12 is preferably constructed of heat-treated steel. To permit of a rocking movement of the link when the leaves of the spring move longitudinally relative to one another as the spring is flexed and to also hold the link in position relative to the bowed member 12, the outer convex surface of said member, intermediate the ends, is arranged with a concave portion 13, for the engagement of the link 10. To anchor the link and the bow-shaped resilient-member to prevent movement thereof longitudinally of the spring, the inner face of said member adjacent one end thereof is arranged with a protuberance or tit 14, preferably of cone shape, to engage in a correspondingly formed depression or recess in the surface of the outer leaf 15 of the spring. This protuberance may be formed by pressing the material of the bowed member 12 outwardly, as shown at 16.

Referring to the form of auto-clip, shown in Figs. 4, 5, 6, and 7, I have illustrated a modification of my invention in which a U-shaped yoke 20 is employed, one arm 21 of which is bow-shaped in form to adapt it to contact with the upper surface of the spring S. The yoke 20 is shown herein as formed from flat stock and is of resilient material, as spring steel, and has therein eyes or openings 22—22' at its ends, through which a connector or bolt 23 is inserted, said bolt being screw-threaded in the ordinary way to adapt it to receive the binding-nut 24. Upon manipulation of this bolt and nut, to apply and retain the desired pressure upon the spring S, serrations 25 on the arm 21 of the yoke 20, in cooperation with the complementary serrations 25' on the under face of the nut 24 or its equivalent, as a bolt-head, furnish the means for locking the clip upon the spring. These complementary serrations are so fashioned that they not only prevent loosening of the nut 24 by vibration, but also fasten and lock said nut in such manner as to permit ready removal thereof. A protuberance 26 formed or fastened on the arm 27 of the yoke 20 is shown for coaction with a complementary depression in the leaf 28 to assure anchoring the clip to the spring S to prevent longitudinal movement of the clip relatively thereto. This same result may also be obtained by applying the adapter-plate arrangement 12 shown in Fig. 2 and above described in connection with the embodiment of my invention illustrated in Figs. 1, 2, and 3. This plate is similarly provided with a projection 14 which co-acts with a depression in the leaf 15 for anchoring the yoke 10 to the spring S. As in Fig. 2, this depression may be somewhat larger than the projection, to prevent entrance of grit and hence excessive wear on the parts. The plate has a bearing seat 13 for the yoke 10, transverse of the spring S. This bearing seat preferably has a curved surface with a radius greater than that of the yoke 10, to permit free rocking of the yoke therein and also for the purpose of eliminating sliding or turning motion, thus avoiding excessive wear of the contacting surfaces. The inner contacting faces of the arms 21 and 27 are convex from side to side, as shown at 29 and 29', in order to permit rocking movement of the clip on the spring after the spring and clip are bound together under any desired predetermined elastic or yielding pressure. I have shown the bolt 23 squared at 30 to prevent turning thereof in the opening 22' of the arm 27, although, as a substitute, a screw-thread may be provided in the eye of the arm 27, and only an ordinary screw with a serrated shoulder in place of the bolt 23 and nut at 24.

Laminated springs ordinarily are made up of parallel leaves of even thickness from end to end. Some springs, however, are made up of leaves which taper in thickness toward their ends, so that the spring as a whole shows considerable taper. In such case, it is desirable to provide a seat for the clip having a concave depression or groove therein so that the bottom thereof will present a surface substantially parallel with the surface on the opposite side of the assembly. This means that the clip will be retained at right-angles to the parallel or main leaf, whereas otherwise it would be somewhat slant. The result of such slant would be to cause the clip to grip excessively tighter as the spring is flexed, causing slippage and undue wear on the pressure side of the clip. 31 may be either a curved metal plate forming a saddle for convex surface 29, as on tapered leaf springs, or it may be of a soft rubber used for the purpose of anchoring the device on any part of the spring which is not provided with holes to receive the tit 26. In fact, this protuberance may be eliminated when the rubber seat is used. It is understood that when under pressure said rubber is substantially cut through at the point of highest pressure of the clip arm, as at 21, and which does not materially enter into the elastic pressure provided by the steel parts of the clip.

I claim:

1. A spring clip, comprising a U-shaped member adapted to engage the upper and lower faces of a multiple-leaf spring, a bar for engagement at the ends of said U-shaped member, and means for retaining and locking said bar on said member.

2. The combination with a multiple leaf-spring, of a U-shaped member adapted to engage the upper and lower faces of the spring, as well as one of the sides of the spring, one portion of said member being bow-shaped and another portion being reduced in cross-section as compared with the other portions thereof, a bar for engagement with said U-shaped member, and means for retaining and locking the bar and said member to form a unitary structure.

3. The combination with a multiple leaf-spring, of a clip for said spring comprising a member adapted to engage and bind the upper and lower faces and one side of the spring, a bar for connecting the ends of the member, and means for retaining and locking the bar upon said member.

4. The combination with a multiple leaf-spring, of a clip therefor comprising a yoke-shaped member having openings at its ends, a connector-bar provided with a lock-nut, for joining and locking the ends of the member, and a protuberance intermediate one of the ends of said yoke-shaped member, adapted to engage a recess in the spring.

5. The combination with a multiple leaf-spring, of a confining clip therefor, said clip comprising an elastic yoke, and means for locking the ends of the yoke to exert a yielding binding pressure upon the spring as a unit.

6. The combination with a multiple leaf-spring, of a yielding confining clip therefor, said clip comprising a yoke of spring metal having its spring contacting faces of convex cross-section, adjustable means for clamping the ends of said yoke under tension to exert a constant yielding binding pressure upon the spring, and means for anchoring the clip to the spring.

7. The combination with a multiple leaf-spring, of a confining clip therefor comprising a yoke having its spring contacting faces of convex cross-section and being made of spring metal, means for putting the parallel arms of said yoke under any desired tension to exert a yielding binding pressure upon the spring as a unit, adjustable means for locking said clip in its binding position, and means for anchoring said clip to the spring.

In testimony whereof, I affix my signature.

ALBERT F. SHORE.